G. C. FANCKBONER.
Hand-Seeder.
No. 45,232.
Patented Nov. 29, 1864.
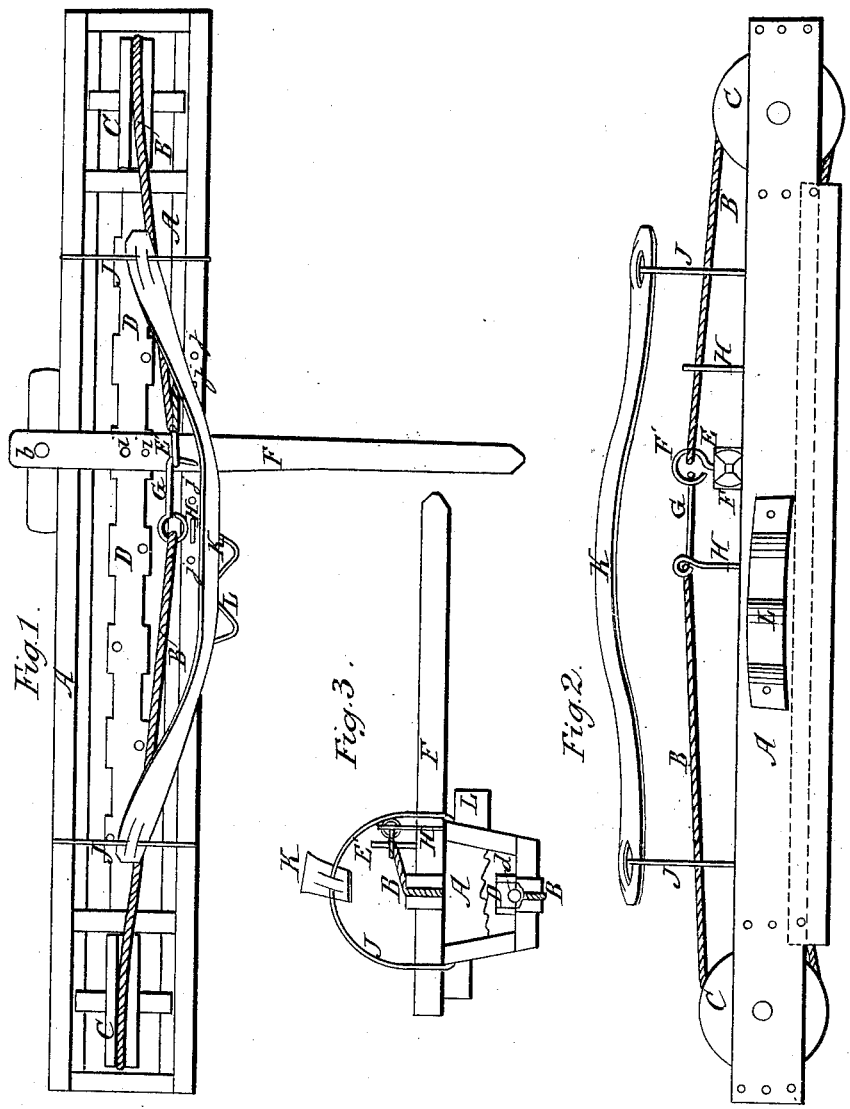
Witnesses.
Isaiah W. Pursel.
Chas. F. Wheeler.
Inventor.
George C. Fanckboner.

UNITED STATES PATENT OFFICE.

GEORGE C. FANCKBONER, OF SCHOOLCRAFT, MICHIGAN.

IMPROVEMENT IN HAND SEED-SOWERS.

Specification forming part of Letters Patent No. 45,232, dated November 29, 1864.

*To all whom it may concern:*

Be it known that I, GEORGE C. FANCKBONER, of Schoolcraft, in the county of Kalamazoo and State of Michigan, have invented certain new and useful Improvements in Seeding-Machines; and I do hereby declare that the following is a full and complete description of the construction and operation of the same, reference being had to the accompanying drawings, making a part of this specification, in which—

Figure 1 is a top view of the machine. Fig. 3 is a side view. Fig. 3 is an end view.

Like letters of reference denote like parts in the several views.

My improvement relates to a seeding-machine so constructed and arranged that any desired quantity of seed can be sown uniformly to the acre, as will be hereinafter described.

A in the several figures represents the seed-box or hopper; C C, pulleys at the ends of the seed-box outside of the inclosed ends for the seed. Over these pulleys passes the rope or cord B, that is connected in the center to the lever F, by means of which it is operated, one end of the rope being secured to an adjustable pin, E, in the lever and the other end attached to a hook, G, that hooks into an eye, E', on the upper end of the pin E. The rope extends along from under the pulleys in a groove, $d$, (seen in Fig. 3,) formed in the bottom of the hopper and in a cap, D, placed over the rope. In this groove the rope moves easily, the cap keeping the weight of the seed from the rope. The lever F is pivoted at $b$, Fig. 1, to a piece secured to the side of the seed-box, from which point it is vibrated or moved back and forth.

H H are gage-pins placed in the upper edge of the inner side of the hopper on each side of the lever to guide the vibrations of the lever, so that the rope will have the same motion every stroke.

K is a shoulder-strap attached at the ends to bails J, connected to the sides of the hopper. Along the bottom of the hopper, at regular intervals, are holes or openings for the seed to fall through, the seed in the hopper passing down on each side of the cap D under the rope. The openings increase in size toward the outside edge, so that the seed will not clog in passing through them. As the rope is drawn back and forth by the action of the lever the corrugations of the rope, together with its movement, agitates the seed and conveys it through the openings.

In using this seeding-machine the strap K is put over the shoulders, and the curved piece L on the side of the hopper comes against the body. The lever F is then moved once for every step, a long or short movement of the lever gaging the quantity of seed to be sown per acre; and the length of the vibrations of the lever is guided by the gage-pins H, which can be placed nearer or farther from each other by means of holes $j$, Fig. 1. The farther they are apart the longer stroke will be given to the lever and more seed will be sown. The quantity of seed sown is also gaged by means of the holes $i$ in the lever F and the adjustable pin E, which will change the motion of the rope.

The object of the hook G and eye E', as described, is not merely to hold the end of the rope and connect the rope to the lever, but by means of them the rope can readily be twisted or untwisted at any time, tightening or slackening the rope as it becomes affected by the weather.

This seeding-machine has been thoroughly tested and found to overcome the difficulties arising from the irregularity with which seed is usually sown, for this machine always sows any desired quantity of seed to the acre, and it will sow mixed seeds with equal facility, there being nothing to agitate the seed in the hopper, causing the smaller seeds to work through at the openings first.

What I claim as my improvement, and desire to secure by Letters Patent, is—

The cord B, pulleys C, and lever F, in combination with gage-pins H H and E and hopper or box A, substantially as and for the purpose set forth.

GEORGE C. FANCKBONER.

Witnesses:
CHAS. F. WHEELER,
ISAIAH W. PURSEL.